US012803957B2

(12) United States Patent
Patel et al.

(10) Patent No.: US 12,803,957 B2
(45) **Date of Patent: *Nov. 17, 2026**

(54) SYSTEMS AND METHODS FOR IN-PROCESS URL CONDEMNATION

(71) Applicant: Proofpoint, Inc., Sunnyvale, CA (US)

(72) Inventors: Pranay Harsadbhai Patel, Broomfield, CO (US); Juan Marcelo Da Cruz Pinto, Portland, OR (US)

(73) Assignee: PROOFPOINT, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/184,886

(22) Filed: Apr. 21, 2025

(65) Prior Publication Data

US 2025/0267121 A1 Aug. 21, 2025

Related U.S. Application Data

(63) Continuation of application No. 18/626,323, filed on Apr. 4, 2024, now Pat. No. 12,316,606, which is a (Continued)

(51) Int. Cl.
*H04L 9/40* (2022.01)
*G06F 16/22* (2019.01)

(Continued)

(52) U.S. Cl.
CPC .......... *H04L 63/0236* (2013.01); *G06F 16/22* (2019.01); *G06F 16/9566* (2019.01); *G06F 16/986* (2019.01); *H04L 63/1416* (2013.01); *H04L 63/1425* (2013.01); *G06F 21/51* (2013.01); *G06F 21/566* (2013.01); *G06F 21/577* (2013.01)

(58) Field of Classification Search
CPC ............ H04L 63/0236; H04L 63/1416; H04L 63/1425; G06F 21/577; G06F 21/51; G06F 21/566
USPC ........................................................... 726/23
See application file for complete search history.

(56) References Cited

U.S. PATENT DOCUMENTS

2002/0073330 A1* 6/2002 Chandnani ............ G06F 21/563 726/26
2005/0108554 A1* 5/2005 Rubin .................. G06F 21/562 713/187

(Continued)

*Primary Examiner* — Samson B Lemma
(74) *Attorney, Agent, or Firm* — Sprinkle IP Law Group

(57) ABSTRACT

A universal resource locator (URL) collider processes a click event referencing a URL and directs a browser to a page at the URL. While the page is being rendered by the browser with page data from a web server, the URL collider intercepts the page data including events associated with rendering the page, determines microfeatures of the page such as Document Object Model objects and any URLs referenced by the page, applies detection rules, tags as evidence any detected bad microfeature, bad URL, or suspicious sequence of events, and stores the evidence in an evidence database. Based on the evidence, a judge module dynamically determines whether to condemn the URL before or just in time as the page at the URL is fully rendered by the browser. If so, the browser is directed to a safe location or a notification page.

20 Claims, 3 Drawing Sheets

Related U.S. Application Data continuation of application No. 18/304,248, filed on Apr. 20, 2023, now Pat. No. 11,973,786, which is a continuation of application No. 17/214,599, filed on Mar. 26, 2021, now Pat. No. 11,716,310.

(60) Provisional application No. 63/133,085, filed on Dec. 31, 2020.

(51) Int. Cl.

| | |
|---|---|
| ***G06F 16/955*** | (2019.01) |
| ***G06F 16/958*** | (2019.01) |
| *G06F 21/51* | (2013.01) |
| *G06F 21/56* | (2013.01) |
| *G06F 21/57* | (2013.01) |

(56) References Cited

U.S. PATENT DOCUMENTS

| | | | | |
|---|---|---|---|---|
| 2007/0174915 | A1* | 7/2007 | Gribble | G06F 21/566 726/24 |
| 2011/0283360 | A1* | 11/2011 | Abadi | H04L 63/1416 726/24 |
| 2013/0086681 | A1* | 4/2013 | Jaroch | G06F 21/566 726/23 |
| 2013/0117849 | A1* | 5/2013 | Golshan | G06F 21/53 726/23 |
| 2013/0145463 | A1* | 6/2013 | Ghosh | G06F 21/53 726/22 |
| 2013/0332988 | A1* | 12/2013 | Thomas | G06F 21/56 726/1 |
| 2015/0261955 | A1* | 9/2015 | Huang | G06F 21/567 726/23 |

* cited by examiner

SYSTEMS AND METHODS FOR IN-PROCESS URL CONDEMNATION

CROSS-REFERENCE TO RELATED APPLICATIONS

This is a continuation of, and claims a benefit of priority under 35 U.S.C. § 120 from, U.S. patent application Ser. No. 18/626,323, filed Apr. 4, 2024, issued as U.S. Pat. No. 12,316,606, entitled "SYSTEMS AND METHODS FOR IN-PROCESS URL CONDEMNATION," which is a continuation of, and claims a benefit of priority under 35 U.S.C. § 120 from, U.S. patent application Ser. No. 18/304,248, filed Apr. 20, 2023, issued as U.S. Pat. No. 11,973,786, entitled "SYSTEMS AND METHODS FOR IN-PROCESS URL CONDEMNATION," which is a continuation of, and claims a benefit of priority under 35 U.S.C. § 120 from, U.S. patent application Ser. No. 17/214,599, filed Mar. 26, 2021, issued as U.S. Pat. No. 11,716,310, entitled "SYSTEMS AND METHODS FOR IN-PROCESS URL CONDEMNATION," which claims a benefit of priority under 35 U.S.C. § 119 (e) from U.S. Provisional Application No. 63/133,085, filed Dec. 31, 2020, entitled "SYSTEMS AND METHODS FOR IN-PROCESS URL CONDEMNATION," all of which are hereby incorporated by reference herein for all purposes.

FIELD OF THE INVENTION

This invention relates generally to cybersecurity and digital risk detection. More particularly, this invention relates to monitoring Universal Resource Locators (URLs) in the network traffic directed to a protected computer network. Even more particularly, this invention relates to systems, methods, and computer program products for in-process or just-in-time URL condemnation.

BACKGROUND OF THE RELATED ART

With the prevalence of URLs everywhere in the online world, phishing threats can come from disparate sources such as websites, emails, text messages, documents, web forms, note-taking applications, and so on. Existing URL monitoring tools can take the URLs found in these sources and analyze website contents on the Internet to which the URLs are linked and condemn the URLs that pose security risks.

For example, a URL monitoring tool may have a URL sandbox function which can analyze URLs that are found in, for instance, inbound emails. When a user clicks on a URL, a click event is generated. Responsive to the click event, the URL monitoring tool may direct the user's browser to a landing page where the user can initiate a URL analysis. In turn, the URL sandbox function runs the URL to explore the content linked by the URL in a safe, sandboxed computing environment, separate from a computing environment on the user's device. If a result from the URL analysis indicates that the content linked by the URL is malicious, access to the content is blocked. If the content linked by the URL is not malicious, the user is notified (e.g., through the landing page) accordingly.

However, this URL sandboxing process, which implements a static pipeline approach, can take time. For each URL, it may take a few minutes to fully render a page linked by a respective URL, obtain data of the rendered page, analyze the obtained data for potential security risks, and generate a result indicating whether the respective URL should be condemned.

What is more, while URLs are easy for bad actors to create and place on the Internet, bad URLs could be hidden from view and not always easy for existing URL monitoring tools to detect. For example, certain features and/or events that pose security risks may not be in the content of a page linked by a URL. Rather, they might be in the header, JavaScript, etc. of the page. These features/events could be interpreted by a browser as the browser renders the page, but disappear after the page is fully rendered. Suppose the content of the page is not determined to be malicious based on an analysis of the content of the page as after the page is fully rendered. This means that the URL linking the page is not condemned, even though the features/events processed and/or interpreted by the browser while the page is in process of being rendered might actually pose security risks.

What is needed, therefore, is a computer-implemented solution that can analyze a page on the Internet linked by a URL while the page is in process of being rendered and that can determine, before or just in time as the page is fully rendered, for instance, on a user device, whether to condemn the URL. Embodiments of an invention disclosed herein can address this need and more.

SUMMARY OF THE DISCLOSURE

A goal of the invention disclosed herein is to provide a computer-implemented solution that can analyze a page on the Internet linked by a URL while the page is in process of being rendered and that can determine, before or just in time as the page is fully rendered, whether to condemn the URL. In embodiments disclosed herein, this goal can be realized in a special URL processor referred to as the URL Collider that is instrumented to communicate with a browser and intercept everything the browser does. Unlike the static pipeline approach taken by prior URL monitoring/scanning tools in which condemnation of a suspicious URL takes place after the URL is processed, the URL collider is adapted for performing in-process URL condemnation.

In some embodiments, a method for in-process URL condemnation can include processing, by a URL collider executing on a computer system operating in a first computer network, a click event referencing a URL. In some embodiments, the click event is obtained from a message queue or received from a URL feed, from a service which handles URL threats, from an agent of the computer system, or from an email server communicatively connected to the computer system.

In some embodiments, the method further includes directing, by the URL collider, a browser running on the computer system to a page at the URL, the page hosted by a web server in a second computer network. In some embodiments, the page has microfeatures such as Document Object Model (DOM) objects. In some embodiments, the browser comprises a headless browser.

In some embodiments, the method further includes, while the page is being rendered by the browser with page data from the web server, performing, by the URL collider: intercepting the page data from the web server, the page data including events associated with rendering the page in the browser; determining, from the page data, microfeatures of the page and any URLs referenced by the page; applying detection rules to the events associated with rendering the page in the browser, the microfeatures of the page, and the URLs referenced by the page, wherein the detection rules comprise a rule which identifies a microfeature as bad, a rule which identifies a URL as bad, and a rule which identifies a sequence of events as suspicious; tagging as evidence any detected bad microfeature, any detected bad URL, and any detected suspicious sequence of events; and storing the evidence in an evidence database.

In some embodiments, the evidence database is accessible by a judge module. Based on the evidence, the judge module dynamically determines whether to condemn the URL before or just in time as the page at the URL is fully rendered by the browser.

In some embodiments, prior to directing the browser to render the page at the URL, the collider may first query the judge module on whether the URL referenced in the click event is known to the judge module. In response, the judge module is operable to compare the URL referenced in the click event with known URLs stored in the evidence database and return, prior to the page at the URL is fully rendered by the browser, a verdict indicating whether the URL referenced in the click event is to be condemned.

The judge module may cache a portion of the evidence database and/or recently discovered suspicious URLs so that a condemnation decision can be made based on locally stored evidence without having to hit the evidence database every time it receives a query from the collider. If the URL referenced in the click event is condemned before or just in time as the page at the URL is fully rendered by the browser, the browser is directed to a safe location or to a notification page.

One embodiment may comprise a system having a processor and a memory and configured to implement a method disclosed herein. One embodiment may comprise a computer program product that comprises a non-transitory computer-readable storage medium storing computer instructions that are executable by a processor to perform the location threat monitoring method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
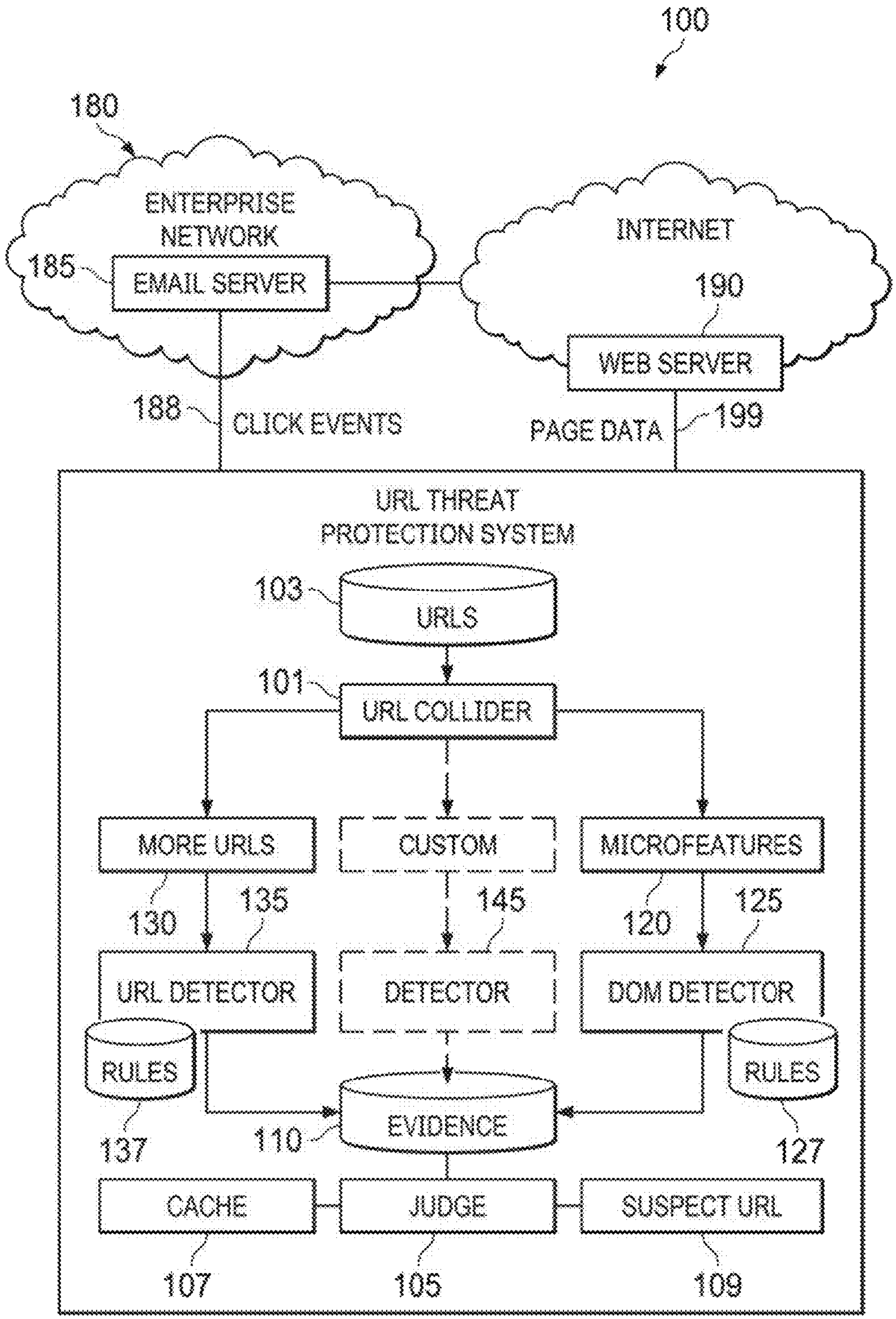
FIG. 1 depicts a diagrammatic representation of a network computing environment where embodiments of in-process URL condemnation disclosed here can be implemented.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

In some embodiments, a system implementing the invention disclosed herein is configured for monitoring URL threats to an enterprise computer network. The system includes a URL collider instrumented to communicate with a browser such as a headless browser. A headless browser refers to a web browser that does not have a graphical user interface. Such a headless browser can render and understand HyperText Markup Language (HTML) the same way a browser would, while also providing automated control of a web page when the headlines browser is executed via a command-line interface or network communication. In some embodiments, a headless browser is used to programmatically dereference and scrape URLs (e.g., text strings representing various URLs retrieved from the Internet and stored in a database).

Alternatively or additionally, the URL collider may communicate with a browser on a user device (e.g., through a wrapper that wraps the browser and sends browser traffic to the URL collider). As a non-limiting example, when a user directs the browser to visit a website at a URL, the browser traffic (e.g., page data from a web server hosting the website) is intercepted and communicated to the URL collider.

As a browser processes a URL of interest (e.g., a URL contained in a click event) and loads a page (e.g., a HTML document) linked by the URL, the URL collider parses the HTML document to obtain microfeatures such as Document Object Model (DOM) objects and more URLs such as image links, etc. As the browser continues to render the page linked by the URL (i.e., while the page residing at the URL is being rendered), detection rules are applied (e.g., by a DOM detector, a URL detector, etc.) to determine whether a microfeature is bad, whether a URL referenced by the page (e.g., a form URL) is bad, and/or whether a sequence of events occurring so far indicates suspicious or malicious content and/or activities. Any detected bad microfeature, URL, or sequence of events is tagged as evidence and stored. Based on the evidence, the URL of interest may be condemned even before rendering of the page linked by the URL is complete. That is, before the page is fully rendered by the browser or just in time as the page is fully rendered, the URL can be condemned as appropriate.

The system includes listeners that, as the page is being rendered, continuously listen for URLs in the microfeatures. As the browser is loading the website and as the browser is admitting an event (e.g., a URL associated with the website), the URL collider continues to collect evidence of any detected bad microfeature, URL, or sequence of events, and stores the evidence in the evidence database. This evidence can be cached for use by a judge component of the system to make an in-process or just-in-time decision on whether to condemn a URL.

For instance, when a URL comes into the system, the system can query the judge component on whether the URL should be condemned. The judge component can access the evidence stored in a local cache and determine, based on the evidence at that moment in time, whether the URL is to be condemned. This just-in-time URL condemnation can take the load off the system.

Additionally, the system keeps track of events occurring while the browser is loading the website. The events taking place while the page is being rendered are analyzed to look for certain event signatures that may indicate malicious activities. This can be done by applying detection rules that define event signatures of interest.

For instance, a sequence of events may indicate that a website or page being loaded by a browser on a user device is attempting to eventually hide an inline frame (e.g., an iFrame). Traditionally, this kind of events can be very difficult to detect because evidence of such activities may disappear after the page is fully rendered and, therefore, will not be discovered by URL monitoring tools that analyze the fully rendered page.

To this end, the system may apply a rule set particularly written (e.g., by domain experts, cybersecurity analysts, etc.) for detecting events of interest based on time-ordering of actions. For instance, a rule may specify that if X event occurs while loading an URL, and Y event occurs, and then Z occurs, then condemn the URL. As a non-limiting example, a rule may specify that if an iFrame pops up while a page residing at an URL is being rendered, but disappears before the page is fully rendered, then the rule is violated. If the rule is violated, the URL can be condemned before rendering of the URL is complete (e.g., on a user's device or in a headless browser environment).

FIG. 1 depicts a diagrammatic representation of a system (e.g., a URL threat protection system) 100 operating in a network computing environment according to some embodiments. The system 100 includes a URL collider 101 which may be communicatively connected to a data store 103 storing URLs (in text strings) from various sources disparate sources such as websites, emails, text messages, documents, web forms, note-taking applications, and so on. Alternatively or additionally, the system 100 may obtain URLs from a processing queue and/or receive URLs from a URL feed, an agent, and/or another system communicatively connected to the system 100.

Figure 2:
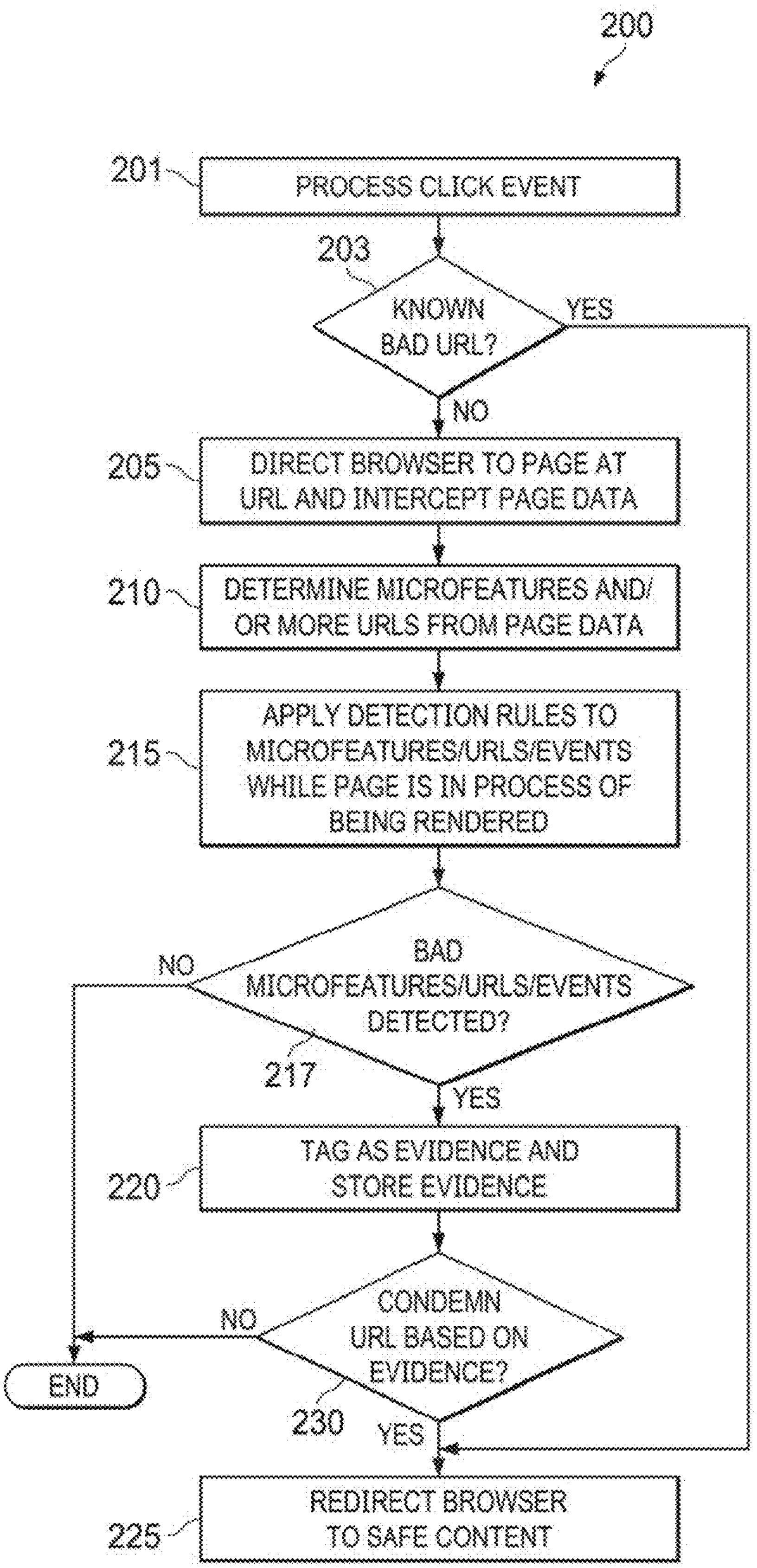
FIG. 2 is a flow chart illustrating an example of a method for in-process URL condemnation according to some embodiments.

As a non-limiting example, URLs can come from emails sent to an email server (e.g., email server 185) operating in a computer network (e.g., enterprise network 180) protected by the system 100. When a recipient of an email clicks on a URL embedded in the email or in an attachment thereof, the click event is captured by the email server or an agent of the system 100. Click events thus collected may be communicated in various ways to the system 100 for processing. FIG. 2 is a flow chart that illustrates an example of a method for processing URLs contained in the client events.

Referring to FIG. 2, a click event or clickstream data containing the click event is communicated to the system 100 for processing (201). In some embodiments, the click event may be processed by the system using a headless browser without a graphical user interface in an environment similar to that of a web browser. In some embodiments, a plurality of click events can be captured and processed by the system. The number of URLs processed by the system at any given time can be massive. Thus, in some embodiments, the URLs may be queued, cached, or otherwise staged in a data store (e.g., data store 103). In one embodiment, a real time click event may be processed by the system as a browser on a user's device attempts to load a website or page linked by the URL in a browser window.

In some embodiments, the system may first check (e.g., with a judge module 105 shown in FIG. 1) to see if a URL contained in a click event is known to the system to be bad (i.e., the URL had already been condemned before) (203). This can be done by comparing the URL with known bad URLs. The system may learn of a bad URL (e.g., the suspect URL 109 shown in FIG. 1), a bad microfeature, or a suspicious sequence of events from a domain expert and/or from previous processing (e.g., through a static URL processing pipeline or the in-process URL condemnation process disclosed herein).

If the URL is known to the system as a bad URL, the browser is redirected to a safe location such as a notification page (225). Otherwise, the browser is directed to the page at or linked by the URL and, as described above, page data communicated from a web server to the browser is intercepted (205). The URL collider, in turn, is operable to determine, from the page data, microfeatures of the page and more URLs referenced in the page (e.g., a form URL) (210).

Examples of microfeatures can include DOM objects which can be used to build a DOM model containing DOM nodes. Each DOM node and any URL such as an image link parsed from the content is further explored and analyzed. More specifically, the URL Collider may utilize various detectors (e.g., DOM detector, a URL detector, a custom detector, etc.) configured for applying detection rules as the content (e.g., an HTML document) linked by the URL is in process of being rendered. Each detection rule may specify what content, activity, or sequence of events is considered malicious (215). If application of the rules indicate that the content, activity, or sequence of events is considered malicious, the URL is considered a bad URL (217). If so, the URL is condemned in process of rendering the content (i.e., before the content is fully rendered) or just in time as rendering of the content is complete (220) and the browser is directed to a safe location (225). Evidence of the URL being a bad one is stored in the evidence database for later use (230). In one embodiment, if there is no evidence that the URL is bad, no information about the URL is persisted.

The evidence database is accessible by the judge component. When a URL is received by the system, the system may first check with the judge component about the URL. The judge component accesses the evidence database and, based on the evidence stored therein, determines whether the URL is bad or not.

Evidence of a bad microfeature, a bad URL, or a suspicious sequence of events thus detected may be stored in an evidence database (e.g., an evidence database 110 shown in FIG. 1). If the URL is known to the system as a bad URL, the browser is redirected to a safe location such as a notification page (225). If the URL is unknown to the system, the system directs a browser (e.g., a headless browser) to a page at the URL of interest. In turn, the browser establishes a communication path with a web server that hosts a website where the page resides. The URL collider is operable to intercept page data that the web server sends to the browser and determine, from the page data as the page is being rendered by the browser, microfeatures of the page and any URLs referenced by the page (205).

The evidence database is continuously updated so that evidence about a URL is always up to date. This can be useful when a threat actor changes the target of a URL. That is, a URL may first look benign during the first scan, but by the third click the content linked by the URL is changed.

The decisions by the judge component can be cached so that the system rarely hits the evidence database unless the system has not seen the URL or has never asked the judge component about the URL. If no evidence is found, the judge component informs the system that the URL is unknown.

A goal of the system is to capture different URL-based threats that may occur when a user clicks a link in an email, on a form, or embedded in an online document and a browser on the user's device is taken to a phishing site or a place with malicious content. Traditionally, a URL monitoring system may provide a service that receives and processes URL feeds. As alluded to above, the amount of URLs can be significant (e.g., eight millions of data in a Kafka message queue) and processing fully rendered URLs can take time. The invention disclosed herein can improve a URL monitoring system by providing the system with an additional ability to condemn a link in process (i.e., while a page residing at the link is being rendered) or just in time as the page thus linked is fully rendered. This has the advantage of allowing the system to provide a more immediate or earlier answer as to whether a URL is to be condemned (e.g., within the first twenty seconds as a page starts to load, as opposed to wait a few minutes until after the page is fully rendered or loaded by the browser on the user device).

Another advantage is that the system can now capture threats through individual events occurring while a page is loading. For instance, a detection rule may specify an event signature—a particular sequence of events that is deemed malicious. By applying the detection rule while a page is in process of being rendered, the system can now recognize that the URL associated with the page that causes the particular sequence of events to occur while the page is being loaded is a bad URL and should be condemned based on this in-process detection of malicious activities. This kind of insight is otherwise not available to conventional URL monitoring systems.

Figure 3:
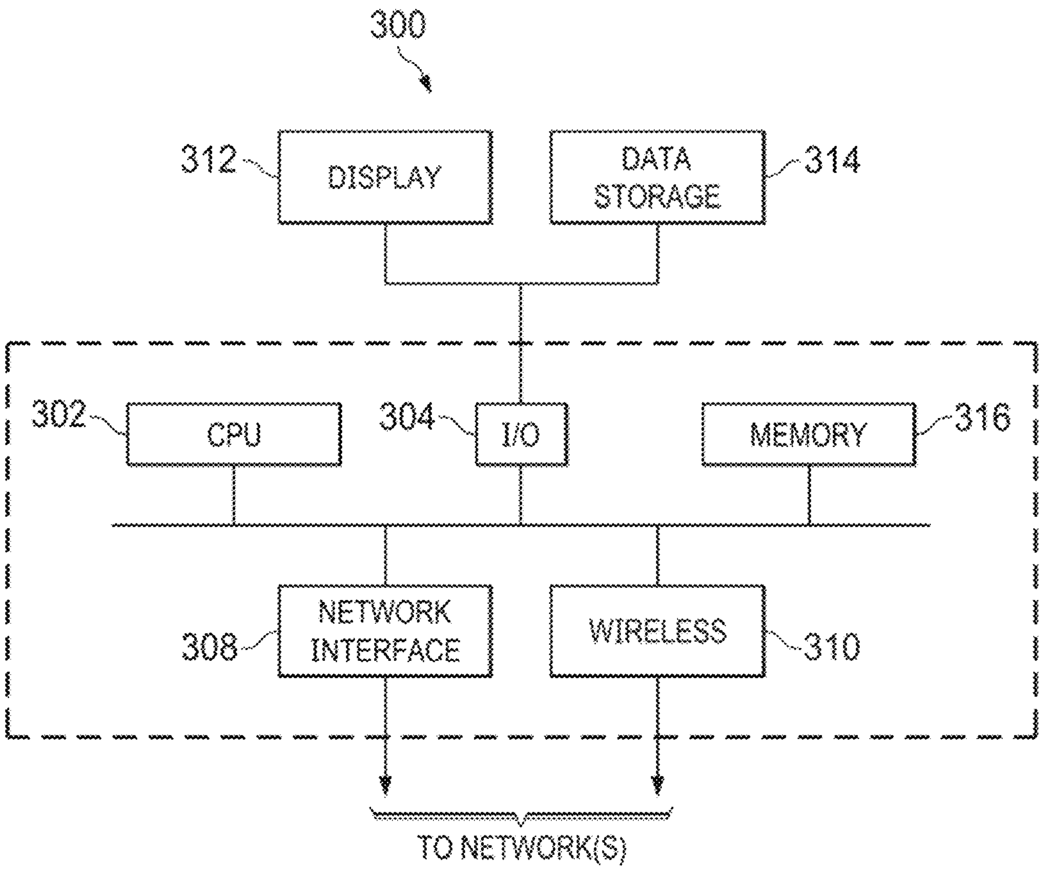
FIG. 3 depicts a diagrammatic representation of a data processing system according to some embodiments.

Embodiments discussed herein can be implemented in a computer communicatively coupled to a network (for example, the Internet), another computer, or in a standalone computer. FIG. 3 depicts a diagrammatic representation of a data processing system for implementing a system for domain filtering.

As shown in FIG. 3, data processing system 300 may include one or more central processing units (CPU) or processors 301 coupled to one or more user input/output (I/O) devices 302 and memory devices 303. Examples of I/O devices 302 may include, but are not limited to, keyboards, displays, monitors, touch screens, printers, electronic pointing devices such as mice, trackballs, styluses, touch pads, or the like. Examples of memory devices 303 may include, but are not limited to, hard drives (HDs), magnetic disk drives, optical disk drives, magnetic cassettes, tape drives, flash memory cards, random access memories (RAMs), read-only memories (ROMs), smart cards, etc.

Data processing system 300 can be coupled to display 306, information device 307 and various peripheral devices (not shown), such as printers, plotters, speakers, etc. through I/O devices 302. Data processing system 300 may also be coupled to external computers or other devices through network interface 304, wireless transceiver 305, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendix, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendix, the meaning of "in" includes "in" and "on" unless the context clearly dictates otherwise.

It should be understood that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure. It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted. The scope of the present disclosure should be determined by the following claims and their legal equivalents.

What is claimed is:

1. A method, comprising:

while a page is being rendered by a browser on a user device, determining that a universal resource locator (URL) associated with the page is unknown as a bad URL;

intercepting page data communicated from a web server to the browser;

determining microfeatures of the page and any URLs referenced by the page;

applying rules to events associated with rendering the page in the browser, the microfeatures of the page, and the URLs referenced by the page;

determining that application of the rules indicates that content, activity, or a sequence of events associated with the page is malicious; and responsive to the page being determined as malicious, condemning the URL before the page is fully rendered on the user device.

2. The method according to claim 1, further comprising:

storing evidence of the URL being determined as malicious in a database.

3. The method according to claim 1, further comprising:

responsive to the page being determined as malicious, directing the browser to a safe URL.

4. The method according to claim 1, wherein the rules comprise a rule specifying a malicious event signature.

5. The method according to claim 1, wherein the URL is referenced in a click event captured by an agent of a threat protection system or an email server.

6. The method according to claim 1, wherein the rules define event signatures of interest.

7. The method according to claim 1, wherein the browser comprises a headless browser.

8. A system, comprising:

a processor;

a non-transitory computer-readable medium; and instructions stored on the non-transitory computer-readable medium and translatable by the processor for:

while a page is being rendered by a browser on a user device, determining that a universal resource locator (URL) associated with the page is unknown as a bad URL;

intercepting page data communicated from a web server to the browser;

determining microfeatures of the page and any URLs referenced by the page;

applying rules to events associated with rendering the page in the browser, the microfeatures of the page, and the URLs referenced by the page;

determining that application of the rules indicates that content, activity, or a sequence of events associated with the page is malicious; and responsive to the page being determined as malicious, condemning the URL before the page is fully rendered on the user device.

9. The system of claim 8, wherein the instructions are further translatable by the processor for:

storing evidence of the URL being determined as malicious in a database.

10. The system of claim 8, wherein the instructions are further translatable by the processor for:

responsive to the page being determined as malicious, directing the browser to a safe URL.

11. The system of claim 8, wherein the rules comprise a rule specifying a malicious event signature.

12. The system of claim 8, wherein the URL is referenced in a click event captured by an agent of a threat protection system or an email server.

13. The system of claim 8, wherein the rules define event signatures of interest.

14. The system of claim 8, wherein the browser comprises a headless browser.

15. A computer program product comprising a non-transitory computer-readable medium storing instructions translatable by a processor for:

while a page is being rendered by a browser on a user device, determining that a universal resource locator (URL) associated with the page is unknown as a bad URL;

intercepting page data communicated from a web server to the browser;

determining microfeatures of the page and any URLs referenced by the page;

applying rules to events associated with rendering the page in the browser, the microfeatures of the page, and the URLs referenced by the page;

determining that application of the rules indicates that content, activity, or a sequence of events associated with the page is malicious; and responsive to the page being determined as malicious, condemning the URL before the page is fully rendered on the user device.

16. The computer program product of claim 15, wherein the instructions are further translatable by the processor for:

storing evidence of the URL being determined as malicious in a database.

17. The computer program product of claim 15, wherein the instructions are further translatable by the processor for:

responsive to the page being determined as malicious, directing the browser to a safe URL.

18. The computer program product of claim 15, wherein the rules comprise a rule specifying a malicious event signature.

19. The computer program product of claim 15, wherein the URL is referenced in a click event captured by an agent of a threat protection system or an email server.

20. The computer program product of claim 15, wherein the rules define event signatures of interest.

* * * * *